United States Patent [19]

Koiwa et al.

[11] 4,333,103
[45] Jun. 1, 1982

[54] AUTOMATIC PHASE ADJUSTING APPARATUS FOR TELEVISION CAMERAS

[75] Inventors: Yoshinori Koiwa; Daishiro Oka; Shoroku Takeda, all of Hinoshi, Japan

[73] Assignee: Asaka Company Limited, Tokyo, Japan

[21] Appl. No.: 180,173

[22] Filed: Aug. 21, 1980

[30] Foreign Application Priority Data

Oct. 9, 1979 [JP] Japan .................. 54-130192

[51] Int. Cl.³ .................. H04N 9/46; H04N 5/04
[52] U.S. Cl. .................. 358/19; 358/149
[58] Field of Search ............ 358/19, 20, 149, 181–183, 358/22, 17, 148

[56] References Cited

U.S. PATENT DOCUMENTS

| 3,420,951 | 1/1969 | Gunther | 358/149 |
| 4,173,023 | 10/1979 | Lagoni et al. | 358/20 |
| 4,214,261 | 7/1980 | Bazin et al. | 358/19 |

*Primary Examiner*—John C. Martin
*Attorney, Agent, or Firm*—Lawrence I. Field

[57] ABSTRACT

An apparatus for automatically adjusting phases of composite synchronizing signals and burst flag signals of a plurality of composite video signals supplied from a plurality of television cameras in order to effect cut-switching, mixing, etc. without a deviation in phase at a video cross point, comprising commonly for the plurality of television cameras a reference signal generator for producing a reference composite synchronizing signal and a reference subcarrier signal, and for each television camera a pair of phase comparators for detecting phase differences between the composite synchronizing signal and burst flag signal at the cross point and the reference composite synchronizing signal and reference subcarrier signal, respectively, a pair of phase shifting circuits for producing composite synchronizing signal and subcarrier signal, respectively having a predetermined phase relationship with respect to the reference signals and a composing circuit for generating a black burst signal including the phase adjusted composite synchronizing signal and the burst flag signal to be supplied to the related television camera.

2 Claims, 2 Drawing Figures

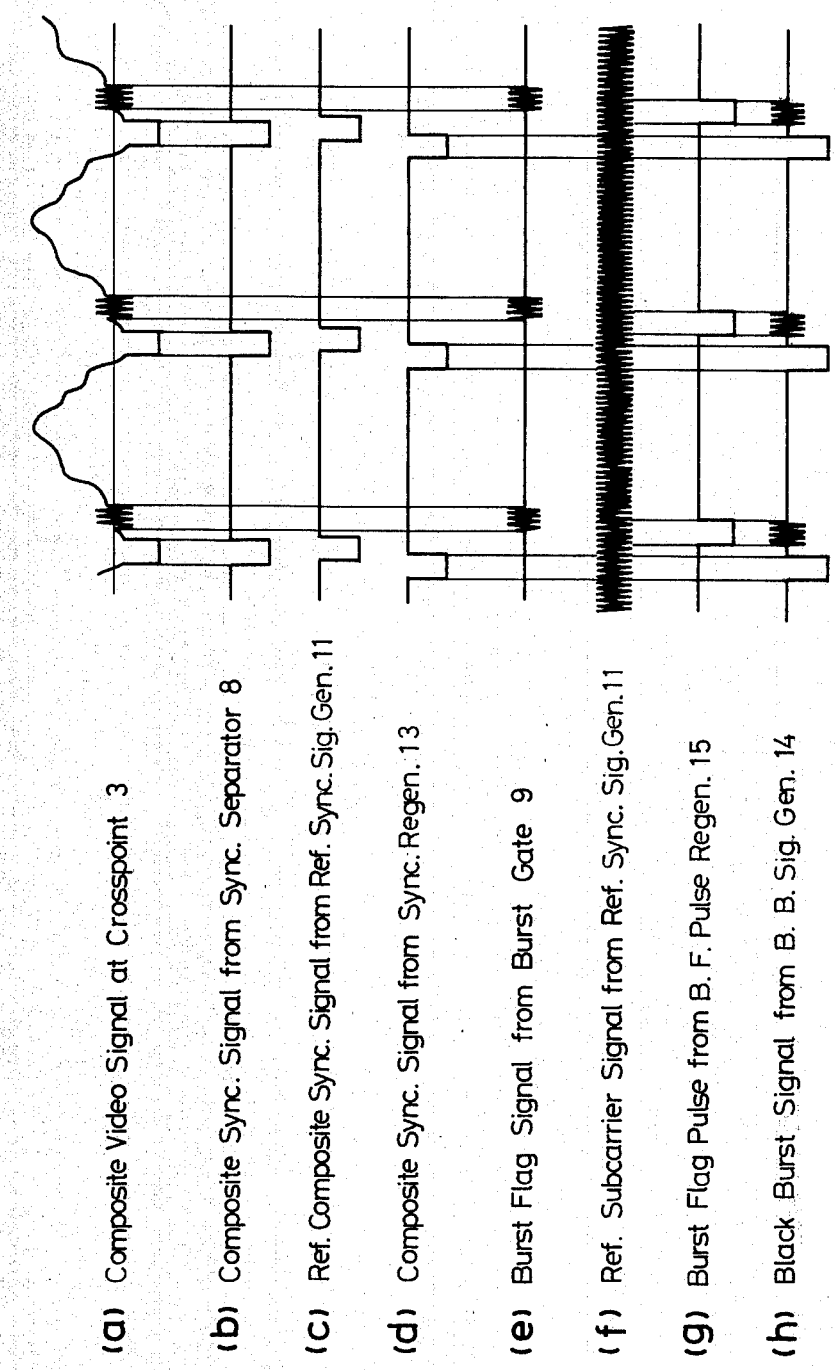

AUTOMATIC PHASE ADJUSTING APPARATUS FOR TELEVISION CAMERAS

BACKGROUND OF THE INVENTION

The present invention relates to an apparatus for use in a system for producing a composite video signal for broadcasting by switching or composing a plurality of composite video signals supplied from a plurality of television cameras, for adjusting automatically phases of the plurality of composite video signals.

In the system for effecting a television broadcasting by means of switching methods such as a cut-switching, mixing etc. for the composite video signals supplied from a plurality of television cameras to a video switcher use is generally made of a video mixing amplifier. In this case the most important condition is that composite synchronizing signals and burst flag signals of a plurality of the composite video signals supplied from a plurality of television cameras should have identical phases at a cross point in the video mixing amplifier at which the cut-switching is effected. If this condition is not satisfied, it is sometimes impossible to construct or reproduce a usefull television picture. In the television cameras with synchronizing generator locked circuits, a black burst signal including a composite synchronizing signal and a burst flag signal is derived from a reference synchronizing signal generator provided in the video mixing amplifier and the composite video signals are transmitted in synchronism with the thus derived black burst signal. However, in practice the composite video signals from a plurality of television cameras have usually different phases at the cross point sue to the fact that the cameras operate under various conditions. In order to overcome such a drawback, in practice lengths of co-axial cables connecting the video mixing amplifier and the respective cameras are adjusted or a horizontal synchronizing phase shifting circuit and a subcarrier signal phase shifting circuit provided in the synchronizing generator locked circuit are adjusted. In this phase adjusting method a relatively long time is required to set the video and mixing system including the television cameras into a usefull condition for broadcasting. Thus the promptitude of collection of subject matter for the television broadcasting could not be expected. Further there is another drawback that required properties could not be always guaranteed due to secular change of components and temperature variation.

SUMMARY OF THE INVENTION

The present invention has for its object to provide an automatic phase adjusting apparatus for a plurality of television cameras, which apparatus can avoid the above mentioned drawbacks and can generate a composite video signal for broadcasting which remains stable even under the cut-switching, mixing, ets., by detecting the composite synchronizing signals and burst flag signals from the composite video signals from a plurality of television cameras at the cross point and making phases of these signals identical with each other in an automatic manner.

To this end, according to the invention in a system for producing a composite video signal for broadcasting by switching, mixing and composing a plurality of composite video signals supplied from a plurality of television cameras, an apparatus for automatically adjusting phases of the plurality of composite video signals comprising commonly for the plurality of television cameras a circuit for generating a reference composite synchronizing signal and a reference subcarrier signal; and for the respective television cameras a circuit for separating a composite synchronizing signal from the composite video signal supplied from the related television camera at a cross point; a circuit for separating a burst flag signal from the composite video signal at the cross point; a circuit for detecting a phase difference between said separated composite synchronizing signal and the reference composite synchronizing signal; a circuit for generating a composite synchronizing signal of a phase which is so adjusted that the detected phase difference becomes a predetermined value; a circuit for detecting a phase difference between said extracted burst flag signal and the reference subcarrier signal; a circuit for generating a subcarrier signal of a phase which is so adjusted that the detected phase difference becomes a predetermined value; a circuit for deriving a burst flag signal from the phase adjusted subcarrier signal, said burst flag signal having a correct phase relation with respect to the phase adjusted composite synchronizing signal; and a circuit for combining the derived burst flag signal and the phase adjusted composite synchronizing signal to generate a synchronous coupling black burst signal to be supplied to the related television camera.

BRIEF DESCRIPTION OF THE DRAWINGS

FIGS. 2(a) to 2(h) illustrates waveforms at various points of the apparatus of FIG. 1 for explaining the operation thereof.

DESCRIPTION OF THE PREFERRED EMBODIMENTS

Figure 1:
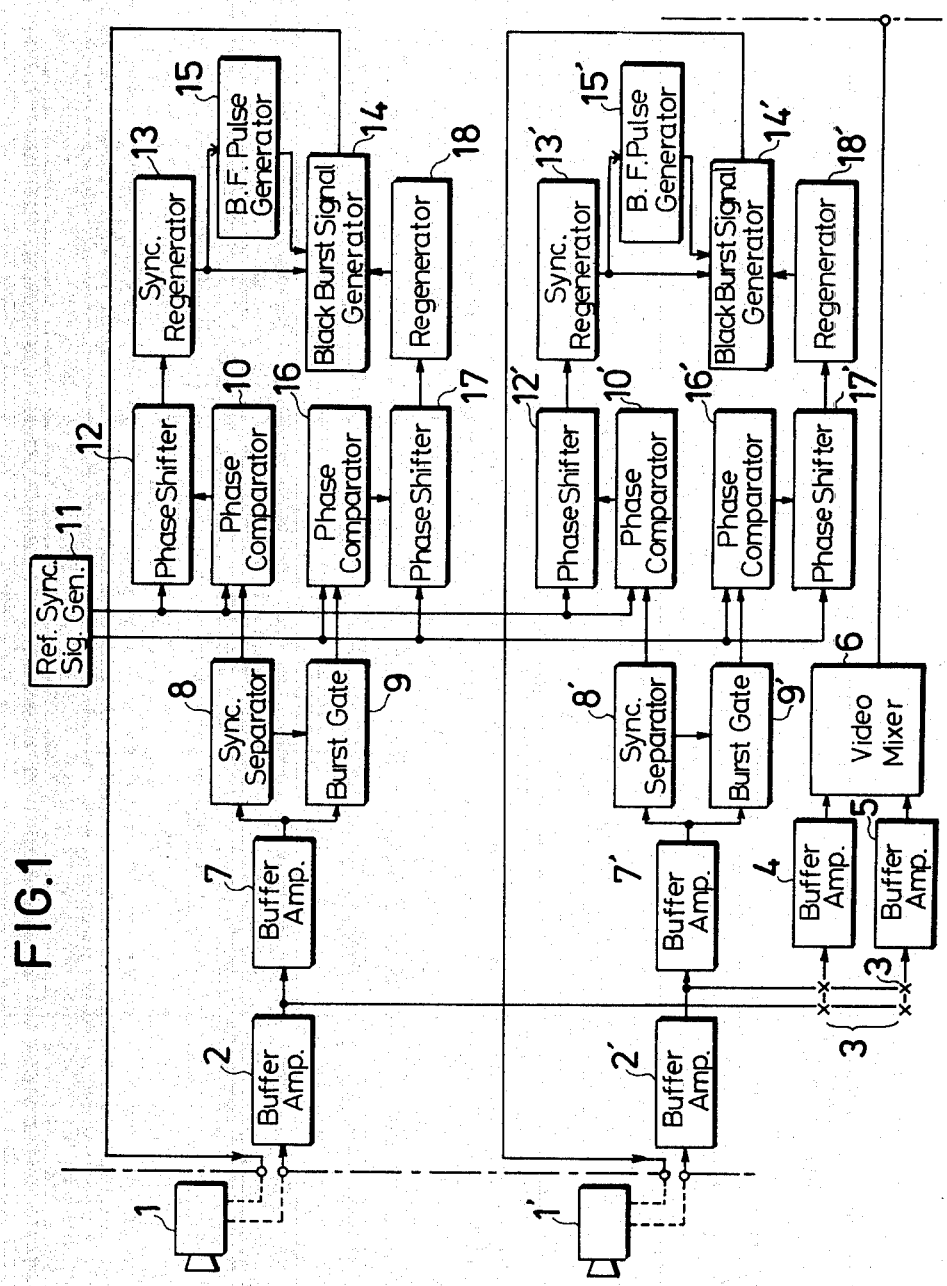
FIG. 1 is a block diagram showing an embodiment of an automatic phase adjusting apparatus according to the invention.

FIG. 1 is a block diagram showing an embodiment of the automatic phase adjusting apparatus according to the invention for treating two sets of television cameras 1 and 1' with synchronous coupling function. It should be noted that a principle of the invention can be entirely equally applied to the system including more than two television cameras with increasing the number of circuit units. Now the construction of the apparatus will be explained with reference to time charts illustrated in FIG. 2. A composite video signal from the television camera 1 is supplied to a buffer amplifier 2 and is then supplied on one hand to a cross point 3 at which a cut-switching, mixing etc. are effected. The composite video signal is further supplied to an A-line buffer amplifier 4 and/or B-line buffer amplifier 5 and a video mixing circuit 6 supplies a main-line composite video signal. The composite video signal from the buffer amplifier 2 is on the other hand used to generate an adjusting signal for synchronizing at the cross points 3 composite synchronizing signals and burst flag signals of the composite video signals supplied from the television cameras 1 and 1'. To this end the composite video signal is supplied to a buffer amplifier 7 which divides the signal into two branch signals, one of which is supplied to a synchronizing signal separator 8 and the other is supplied to a burst gate circuit 9.

In the synchronizing signal separator 8 a composite synchronizing signal shown in FIG. 2(b) is separated by means of, for instance, a low pass filter. The composite synchronizing signal thus separated is supplied to a phase comparator 10 to which is also supplied a reference composite synchronizing signal illustrated in FIG. 2(c) from a reference synchronizing signal generator 11. In the phase comparator 10 phases of these composite synchronizing signals are compared with each other to produce a voltage signal proportional to a detected phase difference. The reference synchronizing signal generator 11 produces the above mentioned reference composite synchronizing signal and a reference subcarrier signal with the aid of a quartz oscillator and it is sufficient to provide only one such a generator regardless of the number of television cameras. The voltage signal proportional to the phase difference is applied to a phase shifter 12 to which is also supplied the reference composite synchronizing signal. The phase of the reference composite synchronizing signal is shifted in such a manner that a feed back loop can ensure a predetermined phase difference between the composite synchronizing signal in the composite video signal and the reference composite synchronizing signal. The phase shifted composite synchronizing signal is supplied to a synchronizing signal regenerator 13 which produces a composite synchronizing signal shown in FIG. 2(d). The phase shifter 12 and the regenerator 13 are known and may be constructed in various ways. For example, a differentiated pulse waveform determining front and rear edges may be treated. The composite synchronizing signal thus produced is supplied to a black burst signal generator 14 as well as to a burst flag pulse generator 15. In FIG. 2 only the horizontal synchronizing signal is shown, but it should be noted that the vertical synchronizing signal is treated in the entirely same manner.

From the composite video signal supplied from the buffer amplifier 7 to the burst gate circuit 9, is derived a burst flag signal shown if FIG. 2(e) by means of a burst flag pulse which can be produced by the synchronizing signal separator 8. The burst flag signal thus derived is supplied to a phase comparator 16 in which the phase of the burst flag signal is compared with the phase of the reference subcarrier signal shown in FIG. 2(f). A voltage signal produced in proportion to the phase difference between these signals is applied to a phase shifter 17 which adjusts the phase of the reference subcarrier signal in such a manner that these signals have a predetermined phase difference. The reference subcarrier having the phase thus adjusted is supplied through a regenerator 18 to the black burst signal generator 14. In this generator 14 a part of the subcarrier signal having the adjusted phase is gated out by means of a burst flag pulse shown in FIG. 2(g) and supplied from the burst flag pulse generator 15 in such a manner that the derived burst flag signal situates at a given position after the composite synchronizing signal. The burst flag signal is then combined with the composite synchronizing signal supplied from the regenerator 13 to form a black burst signal for synchronous coupling illustrated in FIG. 2(h).

The black burst signal thus formed is supplied to the camera 1 which operates on the basis of this signal to produce the composite video signal. In this manner, the composite synchronizing signal and the burst flag signal in the composite video signal supplied from the television camera 1 can have the predetermined phase relationship with respect to the reference composite synchronizing signal and the reference subcarrier signal, respectively. The output composite video signal supplied from the television camera 1' is processed by the entirely same circuits 7' to 18' as the circuits 7 to 18 in the same manner and is adjusted to have the same phase reference with respect to the reference signals supplied from the reference signal generator 11 as in the case for the television camera 1. Therefore, it is guaranteed that at the cross point 3 there is no phase difference between the composite video signals supplied from the television cameras 1 and 1'. Thus the composite video signal supplied from the video mixing circuit 6 on the main line can have high quality without disturbing the picture even at the cut-switching, mixing, etc.

It should be noted that the present invention is not limited to the embodiment explained above, but may be modified in various ways within the scope of the invention defined by the following claims.

As explained above in the automatic phase adjusting apparatus for television cameras according to the invention, the phases of the composite video signals supplied from a plurality of television cameras can be automatically made identical with each other. Therefore, the various adjustements of phases of various signals supplied from any number of television cameras are not required at all prior to the broadcasting and even during the broadcasting a phase difference between the composite video signals does not occur even if the enviromental conditions might change.

What is claimed is:

1. In a system for producing a composite video signal for broadcasting by switching, mixing and composing a plurality of composite video signals supplied from a plurality of television cameras, an apparatus for automatically adjusting phases of the plurality of composite video signals comprising commonly for the plurality of television cameras a circuit for generating a reference composite synchronizing signal and a reference subcarrier signal; and for the respective television cameras a circuit for separating a composite synchronizing signal from the composite video signal supplied from the related television camera at a cross point;

a circuit for separating a burst flag signal from the composite video signal at the cross point;

a circuit for detecting a first phase difference between said separated composite synchronizing signal and the reference composite synchronizing signal;

a circuit for shifting the phase of the reference composite synchronizing signal in accordance with the detected first phase difference in such a manner that the detected first phase difference becomes a predetermined value;

a circuit for detecting a second phase difference between said extracted burst flag signal and the reference subcarrier signal;

a circuit for shifting the phase of the reference subcarrier signal in accordance with the detected second phase difference in such a manner that the detected second phase difference becomes a predetermined value;

a circuit for deriving a burst flag signal from the phase shifted reference subcarrier signal, said burst flag signal having a corrected phase relation with respect to the phase shifted reference composite synchronizing signal; and a circuit for combining the derived burst flag signal and the phase shifted reference composite synchronizing signal to generate a synchronous coupling black burst signal to be supplied to the related television camera.

2. An automatic phase adjusting apparatus according to claim 1, wherein the burst flag signal is derived from the phase shifted reference subcarrier signal with the aid of a burst flag pulse which is generated on the basis of the phase shifted reference composite synchronizing signal.

* * * * *